A. M. DUDLEY.
COIL RETAINING DEVICE FOR DYNAMO ELECTRIC MACHINES.
APPLICATION FILED MAY 26, 1917.

1,320,126. Patented Oct. 28, 1919.

WITNESSES:
William Siler
O. W. Kennedy

INVENTOR
Adolphus M. Dudley.
BY
Wesley G. Carr
ATTORNEY

UNITED STATES PATENT OFFICE.

ADOLPHUS M. DUDLEY, OF OAKMONT, PENNSYLVANIA, ASSIGNOR TO WESTINGHOUSE ELECTRIC & MANUFACTURING COMPANY, A CORPORATION OF PENNSYLVANIA.

COIL-RETAINING DEVICE FOR DYNAMO-ELECTRIC MACHINES.

1,320,126.  Specification of Letters Patent.  Patented Oct. 28, 1919.

Application filed May 26, 1917. Serial No. 171,170.

*To all whom it may concern:*

Be it known that I, ADOLPHUS M. DUDLEY, a citizen of the United States, and a resident of Oakmont, in the county of Allegheny and State of Pennsylvania, have invented a new and useful Improvement in Coil-Retaining Devices for Dynamo-Electric Machines, of which the following is a specification.

My invention relates to coil-retaining devices for dynamo-electric machines, and it has for its object to provide a device of the character indicated that may be readily applied to the coil-containing slots of dynamo-electric machines.

In the construction of dynamo-electric machines, it has heretofore been a problem to provide coil-retaining devices that may be readily removed from the slots without the application of such a degree of force as might destroy the devices or injure the insulation of the coils that are retained in the slots by them.

By my invention, I provide a coil-retaining device that may be applied to a slot with any desired degree of wedging action and then firmly locked in position. Furthermore, my device may be as readily removed from the slot, by the application of a force that is just sufficient to initially move the members comprising the device, after which it may be withdrawn without the application of any additional force.

Figure 1:
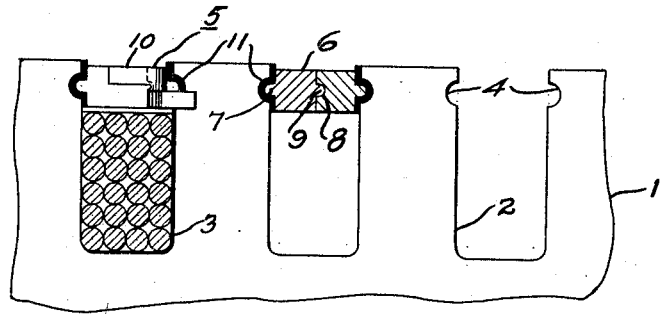
Figure 2:
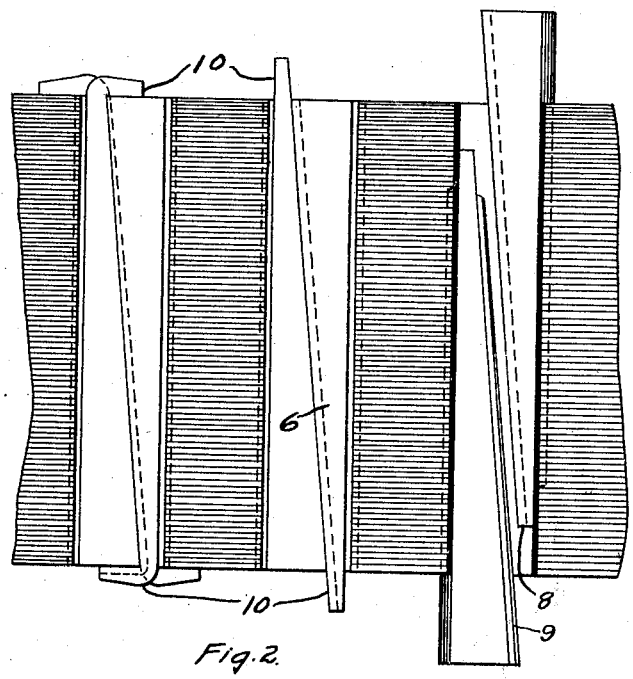

In the accompanying drawings, Figure 1 is a view, partially in section and partially in end elevation, of a portion of the core member of a dynamo-electric machine embodying my invention, and Fig. 2 is a plan view of the core member shown in Fig. 1, showing several steps in the application of my coil-retaining device thereto.

Referring to Fig. 1, the core member 1 of a dynamo-electric machine is provided with slots 2 in which are located coils 3. The walls of each slot 2 are provided with oppositely disposed grooves 4 that are adapted to receive correspondingly shaped portions of coil-retaining devices 5 for maintaining the coils 3 in position.

Each coil-retaining device 5 comprises wedge-shaped members 6 that are respectively provided along one edge with a longitudinal projection 7 for engaging the grooves 4. The inclined edges of each pair of members 6 are provided with corresponding projecting and recessed portions 8 and 9. The members 6 of each device 5 project beyond the ends of the core member 1, and the divided projecting portions 10 of each member are bent over in opposite directions to lock the members against longitudinal movement in the slot 2, as well as with respect to each other. A layer 11 of insulating material is provided between the members 6 and the walls of the slot although the insulation may be omitted when the members 6 are formed of non-magnetizable or non-conducting material.

In applying a coil-retaining device 5 to a slot 2, the members 6 are inserted at opposite sides of the core member 1, with the projecting portions 7 located in the grooves 4. The members 6 are moved in opposite directions until their inclined faces come into engagement and sufficient force is then applied to the bases of the members 6 to bring them substantially flush with the ends of the core 1. The divided end-portions 10 are then bent over in opposite directions, as previously described, to lock the device 5 in position. It is obvious that, whenever it is desired to move one of the coil-retaining devices 5, it is only necessary to bend the portions 10 back to their original form and then apply sufficient force to the end portions 10 to start the members 6, after which they may be removed from the slot 2 without the application of any additional force.

While I have shown my invention in a simple and preferred form, it is not so limited but is susceptible of various minor changes and modifications within the scope of the appended claims.

I claim as my invention:—

1. In a dynamo-electric machine, the combination with a core member provided with a plurality of coil-containing slots, of devices for holding said coils in position, each of which comprises two oppositely inclined members adapted to be in wedging engagement with each other and with the walls of the slot adjacent the outer edges thereof.

2. In a dynamo-electric machine, the combination with a core member provided with a plurality of coil-containing slots, of devices for holding said coils in position, each of which comprises two oppositely inclined members adapted to be in wedging engagement with each other and with the walls of the slot adjacent the outer edges thereof, the ends of said wedging members protruding from said slots being bent so as to engage the core adjacent the slot and to engage the coacting wedging member.

3. In a dynamo-electric machine, the combination with a core member provided with a plurality of coil-containing slots, of devices for holding said coils in position, each of which comprises two oppositely inclined members adapted to be in wedging engagement with each other and with the walls of the slot adjacent the outer edges thereof, said wedging members being attached to each other and to the walls of the slot by means of rabbeted joints.

4. In a dynamo-electric machine, the combination with a core member provided with a plurality of coil-containing slots having longitudinal grooves near their outer edges, of devices for holding said coils in position, each of which comprises two oppositely inclined members adapted to wedgingly engage the sides of the slots and each other, said wedging members having tongues projecting into the grooves in the slots, and a layer of insulating material interposed between said wedging member and said slot wall.

5. In a dynamo-electric machine, the combination with a core member provided with a plurality of coil-containing slots, of coil-retaining devices disposed in said slots and comprising two oppositely inclined members wedgingly engaging the walls of said slot and each other, the wide portion of said wedges being disposed flush with the end of said core member and the narrow portions thereof projecting from said core member and being bent so as to engage the end of the core member and the end of the wide portion of the coacting wedging member.

6. In a dynamo-electric machine, the combination with a core member provided with a plurality of coil-containing slots, of coil-retaining devices disposed in said slots and each comprising two oppositely inclined members wedgingly engaging each other and the sides of the slots and both having their narrow ends projecting from the end of the slot, said projecting ends being split and one portion thereof being bent so as to engage the end of the core member adjacent the slot and the other being bent so as to engage the end of the wide portion of the coacting wedging member.

In testimony whereof, I have hereunto subscribed my name this 19th day of May, 1917.

ADOLPHUS M. DUDLEY.

Copies of this patent may be obtained for five cents each, by addressing the "Commissioner of Patents, Washington, D. C."